Oct. 11, 1960

A. CLAUD-MANTLE 2,955,862

BOX LID FASTENER

Filed Nov. 5, 1957

INVENTOR

Arthur Claud-Mantle

BY Rockwell & Bartholow

ATTORNEYS

Oct. 11, 1960 A. CLAUD-MANTLE 2,955,862
BOX LID FASTENER
Filed Nov. 5, 1957 2 Sheets-Sheet 2
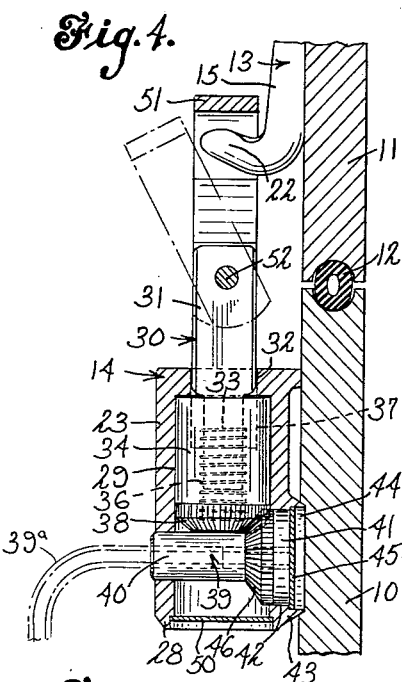
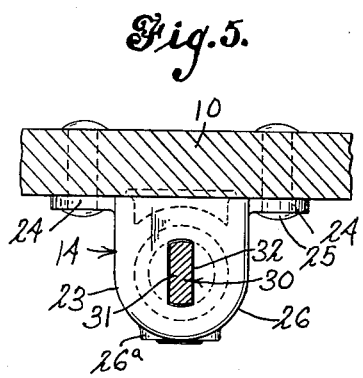
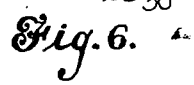
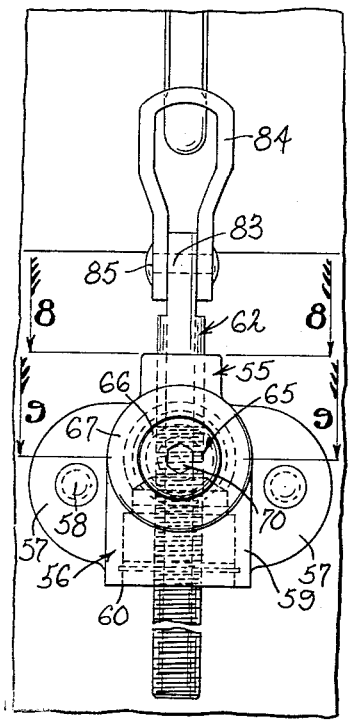
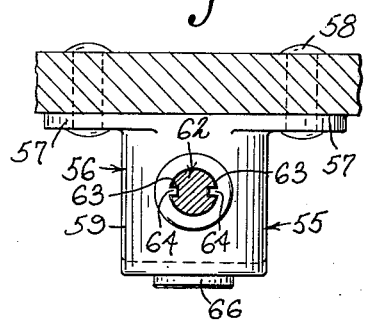
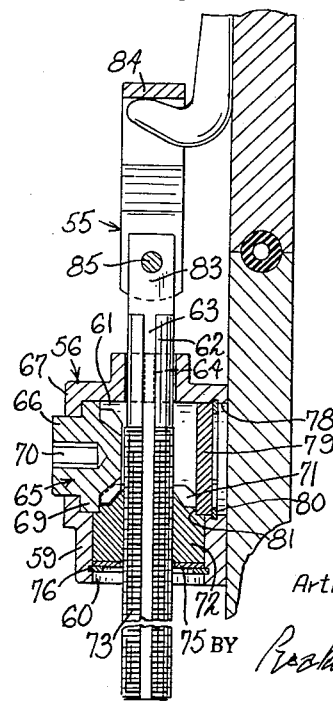
INVENTOR
Arthur Claud-Mantle
BY
ATTORNEYS United States Patent Office 2,955,862
Patented Oct. 11, 1960

2,955,862

BOX LID FASTENER

Arthur Claud-Mantle, Trumbull, Conn., assignor to The Bassick Company, Bridgeport, Conn., a corporation of Connecticut Filed Nov. 5, 1957, Ser. No. 694,542

7 Claims. (Cl. 292—246)

This invention relates to fasteners and, while not limited thereto, relates to fasteners particularly useful on boxes, especially boxes and like containers used for carrying and storing articles which must be protected from moisture, vapor and the like. Such containers usually include a lower body part, an upper lid part and gasket means between the parts and adapted to provide an effective seal when the parts are drawn together through the action of the fasteners.

One object of the invention is to provide a fastener of the type indicated above, having parts of novel construction and arrangement.

Another object is to provide a fastener including a screw member having a retainer-engaging part thereon, the screw member being driven by a rotary nut member.

Another object is to provide a fastener such as characterized above, which is admirably suited for mounting externally of the box, which is of the gear-operated type and includes bevel gears cooperating with a rotatable nut, and which includes a rectilinearly movable screw element driven from the nut and pivotally connected to a vertically swingable retainer-engaging member.

Still another object of the invention is to provide a fastener having few and simple parts, which is easy to operate and dependable in service, and which is economical to manufacture.

Other objects of the invention will be apparent from the following detailed description of two forms of the fastener which are illustrated in the accompanying drawings by way of example.

In the drawings:

Fig. 4 is a view similar to Fig. 3 but showing the parts of the fastener in unlatched condition;

Fig. 5 is a sectional view on line 5—5 of Fig. 1;

Fig. 6 is a view similar to Fig. 1, illustrating a modified form of the fastener;

Fig. 7 is a view similar to Fig. 3 but illustrating the modified form of the fastener;

Fig. 8 is a sectional view taken on line 8—8 of Fig. 6; and

Fig. 9 is a sectional view taken on line 9—9 of Fig. 6.

For the protection of instruments and other articles or apparatus requiring protection from moisture, vapor or the like, containers or boxes made of metal or other suitable material have been used and fasteners have been employed with such boxes to exert pressure on the box body and lid to compress a gasket or like sealing member therebetween. However, some of the fasteners heretofore employed on such boxes have been open to certain objections and the present invention contemplates the provision of a fastener overcoming these objections.

Figure 1:
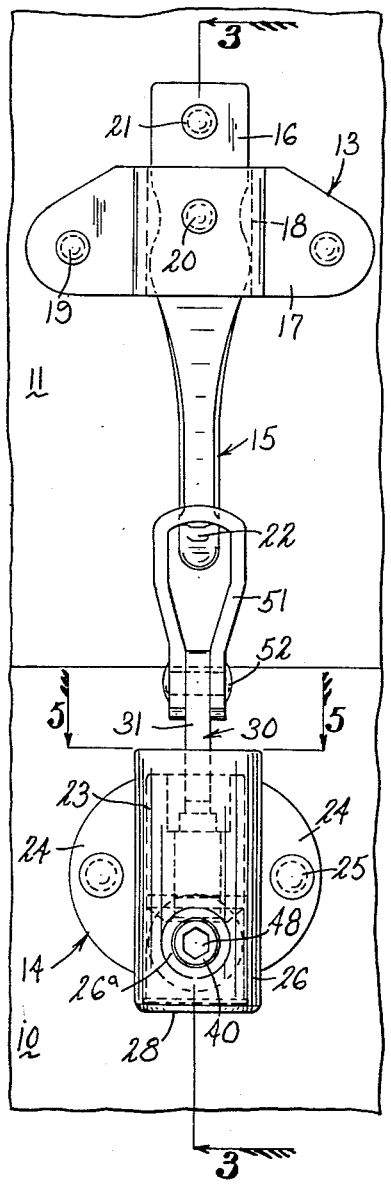
Fig. 1 is a fragmentary external view of a container or box illustrating the same in elevation and illustrating a fastener embodying the invention, the fastener being shown in latched condition.
Figure 2:
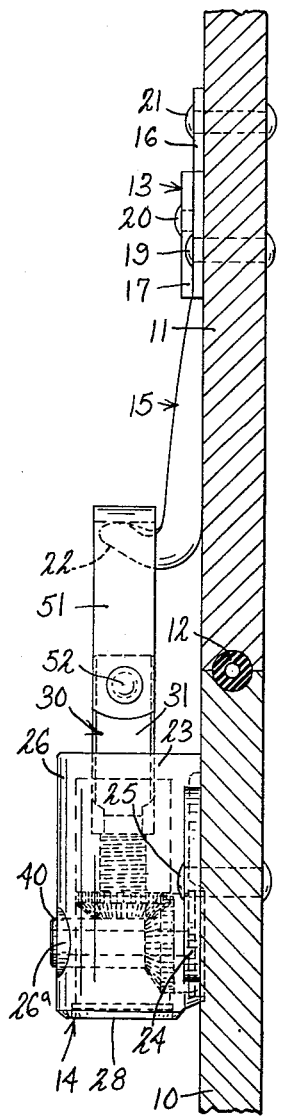
Fig. 2 is an elevational sectional view through a part of the box structure further illustrating the fastener.

In the form shown in Figs. 1 through 5 of the drawings, the box body is indicated at 10 and the box lid at 11. A compressible gasket member 12 is interposed between the body 10 and the lid 11 so that when the body and lid are drawn tightly toward one another the gasket is compressed and forms an effective seal between the parts of the box. In the form shown in Figs. 1 through 5, a retainer element is mounted on the outer face of the lid 11 and a catch element is mounted on the outer face of the body 10, the retainer element being indicated generally at 13 and the catch element being indicated generally at 14. The retainer element 13 includes a downwardly and outwardly extending hook member 15 which may be formed of wire stock. The member 15 is provided with a flattened shank portion 16 across which extends a strap 17. The strap 17 is provided with an inwardly facing channel portion 18 which receives the flattened portion 16 of the hook member, the arrangement being such that the last-mentioned portion of the hook member is sandwiched between the strap 17 and the side wall structure of the box lid. The ends of the strap 17 are riveted to the box lid, as at 19. A rivet 20 extends through the middle portion of the strap 17 and also extends through the flattened portion 16 of the hook member. As shown in Fig. 1, the strap 17 extends across the member 15 intermediate the ends of the latter. The upper end of the member 15 is riveted to the box lid, as at 21. As shown in the last-mentioned view, the flattened portion 16 of the hook member is closely received in the channel portion 18 of the strap, and the arrangement is such that the hook member 15 is secured to the box lid in a manner to strongly resist axial and angular dislocations thereof. The catch element 14 cooperates with the lower outwardly-extending hooked end 22 of the member 15, this hooked end being formed in the manner shown in Figs. 1 and 2.

Figure 3:
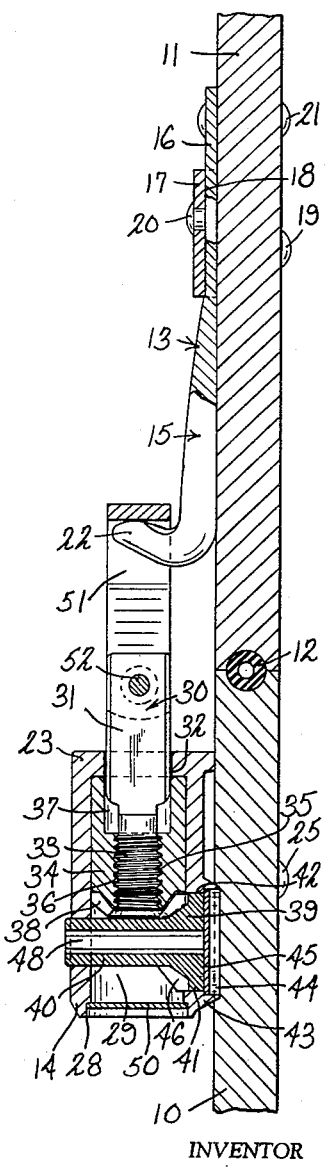
Fig. 3 is a sectional view taken on line 3—3 of Fig. 1.

The catch element 14 includes a body member 23 elongated in a vertical direction. Ears 24 are formed integrally with the body member 23 for attachment to the side wall structure of the box body, as by rivets 25. The body member 23 may be formed conveniently as a die casting and has a generally rounded part 26 (Fig. 5) projecting outwardly from the box body. The body member, which is substantially hollow, is formed so as to be open at the lower end 28 and provides an upwardly extending cylindrical chamber 29. A vertically arranged reciprocating screw member 30 extends through the upper end of the body member. The upper part 31 of the member 30 is of flattened cross section and extends through a correspondingly formed opening 32 (Fig. 5) in the upper end of the body member, the arrangement being such that angular rotative movement of the screw member is prevented. The lower part of the screw member is threaded, as at 33, and extends into a nut member 34 received in the upper part of the chamber 29. The nut member 34, which is generally of cylindrical form, is rotatable in the chamber 29 and substantially fills the upper part thereof. The nut member 34 is provided with a vertically arranged bore 35 extending therethrough and threaded at the lower part thereof, as at 36, for cooperation with the threads 33 of the screw member. The upper part of the bore 35 is enlarged, as at 37, to receive the flattened portion 31 of the screw member, as shown in Fig. 3. The nut member is provided with an integrally and concentrically formed bevel gear 38 at the lower end thereof.

The nut member 34 is at least partially positioned and supported by a bevel gear member 39 meshing with the bevel gear 38. The bevel gear member 39 has a concentric and integrally formed shaft portion 40 extending transversely of the chamber 29 directly below the lower end of the nut member 34, the shaft portion 40 being journaled in and extending through a boss 26ᵃ on the outer face of the body member 23. The bevel gear member 39 is provided with a cylindrical portion 41 at the inner end thereof, the portion 41 being closely received in an opening 42 in the inner face of the body member 23 and having bearing contact therein. The opening 42 is formed in an inwardly extending boss 43 provided on the member 23 and the opening 42 is enlarged, as at 44. As shown in Fig. 3, the front-to-back dimension of the body member 23 is greatest in the region of the boss 43, and the boss 43 may be recessed to some extent in the side wall structure of the box body. A sealing member 45 of disk form is positioned in the enlargement 44 of the opening 42 so as to bottom therein and the sealing member 45 is held in place by any suitable means. As shown in Fig. 3, the cylindrical portion 41 of the member 39 is adjacent the sealing member 45 and the bevel teeth of the member 39, indicated at 46, meshing with the teeth of the bevel gear 38, occupy a position adjoining and outwardly of the cylindrical portion 41. A nonround or hexagonal bore 48 extends through the bevel gear member 39 concentrically of the latter. Thus it will be understood that the nut member 34 may be driven from the gear member 39 by turning a key wrench 39ᵃ (Fig. 4) removably inserted in the nonround bore 48 in the member 39. It will also be understood that turning movement of the key wrench in one direction effects, through the nut member 34, lengthwise movement of the screw member 30 in one direction, and that rotation of the key wrench in the opposite direction effects movement of the screw member in the opposite direction. The opening in the lower end 28 of the body member 23 is closed by a sealing member 50 of disk form to inhibit the passage of dirt or other foreign material to the aforementioned gear teeth. The sealing member 50 may be secured to the body member 23 in any suitable well known manner.

A bail-like member 51 is provided for engagement with the lower hooked end 22 of the retainer element and the arms of the bail-like member straddle and are pivoted to the upper end of the screw member 30, as at 52. The arrangement is such that when the bail-like member 51 is in the latched position of Fig. 2 the last-mentioned member is very firmly engaged over the hooked end 22 of the retainer element and exerts sufficient downward pressure on the latter to compress the gasket 12 between the box body and lid. To release the catch element the key wrench is inserted in the bevel gear member 39 and turned in a direction to effect upward movement of the screw member 30 through rotation of the nut member 34. As pointed out above, the cooperation of the flattened upper part 31 of the member 30 with the upper part of the body member 23 prevents rotation of the screw member. When the screw member and the bail-like member 51 are raised to the full-line position of Fig. 4, the bail-like member may be grasped and swung outwardly to the broken-line position of the last-mentioned figure so that the retainer element may clear the catch element when the box lid is subsequently lifted and removed from the box body. It will be understood that while only a single fastener has been illustrated in Figs. 1 through 5, a plurality of such fasteners are usually employed to secure a lid to a box body.

From the foregoing, it will also be understood that to latch the fastener shown in Figs. 1 through 5 the lid is first replaced on the box body and then the bail-like member 51 is grasped and swung over the lower hooked end 22 of the retainer element. The key wrench may then be rotated to effect downward movement of the screw member 30 pivotally connected to the bail-like member 51, thereby drawing the lid down tightly on the box body. It may be noted that in this form the shaft portion 40 of the bevel gear member, which extends below the nut member 34, prevents the screw member 30 from being extended downwardly beyond the lower end of the nut member 34. However, when the fastener is mounted on a box in the manner shown in Fig. 3, for example, the arrangement is such that when the catch element is engaged with the retainer element downward movement of the screw member is limited not by the aforementioned shaft portion but by engagement of the lid with the box body.

In the modified form of the fastener shown in Figs. 6 through 9, the fastener is the same as that described above except for the catch element. The catch element is indicated generally at 55 and includes a die-cast body member 56 similar in some respects to the body member 23 described above. The body member 56 is provided with integrally formed ears 57 which may be riveted to the box body, as at 58. The body member is provided with an outwardly projecting vertically elongated part 59 and is substantially hollow and generally of rectangular shape in cross section, the member being formed so as to be open at the bottom 60 thereof and providing an upwardly elongated chamber 61. A screw member 62 extends through the body member in a vertical direction and is provided with diametrically opposite keyways 63 extending almost entirely throughout the length of the screw member and cooperating with keys 64 integrally formed on the upper part of the member 56, the arrangement being such that angular or rotative movement of the screw member is prevented.

A bevel gear member 65 is provided having an integrally and concentrically formed shaft portion 66 extending outwardly through and journaled in a boss 67 formed on the upper part of the outer face of the member 56. The bevel gear member 65 extends transversely into the chamber 61 and is provided with a cylindrical part 69 adjoining the inner end of the shaft portion 66 and of larger diameter. The arrangement is such that the cylindrical part 69 of the member 65 is seated in the boss 67, as shown in Fig. 7. The bevel gear member 65 is provided with a concentric and outwardly facing dead-end bore 70 of nonround or hexagonal form to removably receive a key wrench (not shown) for turning the bevel gear member 65.

The bevel gear member 65 meshes with the bevel teeth 71 formed concentrically and integrally on the upper end of a nut member 72. The nut member 72 substantially fills the lower end of the chamber 61 in the body member and is internally threaded to cooperate with the threads 73 formed on the screw member 62 and extending from the lower end thereof to a point at least midway between the ends of the last-mentioned member. The nut member 72 is supported from below by a washer 75 embracing the screw member 62 and supported, in turn, by a snap ring 76 associated with the body member. At the rear or inner face thereof the body member 56 is provided with a round opening 78 concentric with the opening through which the bevel gear member 65 extends. The last mentioned member may be inserted through the opening 78 for assembly with the body member 56. As shown in Fig. 7 for example, the opening 78 is closed by a sealing member 79 of disk form. Inward dislocation of the sealing member 79 is prevented for an adjoining snap ring 80 supported in the body member while outward dislocation of the sealing member is prevented by a shoulder 81 formed on the nut member 72. This shoulder, which is of annular form, also bears against the portion 69 of the gear member 65 to prevent axially inward dislocation of the latter.

The upper end of the screw member 62 is flattened, as at 83, and a bail-like member 84, similar to the bail-like member 51, straddles the last-mentioned end of the screw member and is pivoted thereto, as at 85. From the foregoing it will be understood that the bevel gear member 65 may be turned in one direction to effect upward movement of the screw member 62 and may be turned in the other direction to effect downward movement of the screw member. The operation of the catch element 55 is similar to the operation of the catch element 16, described above.

In the form of Figs. 6 to 9, the screw member is extensible through the nut member 72 and has a greater amplitude of movement. Hence in the form shown in Figs. 6 through 9, the catch element 55, while being extremely useful for latching a box lid, may, if desired, be employed as a hold-down device. In each form the arrangement of the bevel gears is such that dislocation of the screw member relatively to the nut member is strongly inhibited when the screw member is under tension. In each form the operating bevel gear member which, if desired, may be adapted to be turned by means other than a wrench inserted in the last-mentioned member, has its axis disposed in a horizontal plane and the gear teeth of the member mesh with a bevel gear having its axis disposed in a vertical plane.

In view of the foregoing disclosure, it will be understood that there is provided an improved fastener admirably suited for mounting externally of a box and which is of the key-operated type, including bevel gears which drive a rectilinearly movable screw member through a rotatable nut, the screw member being pivotally connected to a vertically swingable retainer-engaging member. It will be further understood that a fastener is provided which has few and simple parts, which is easy to operate and dependable in service, and which is economical to manufacture.

While two forms of the fastener have been illustrated in the drawings and described above, it will be understood that the fastener may take other forms and is susceptible of various modifications and changes in details without departing from the principles of the invention and the scope of the appended claims.

What I claim is:

1. In a fastener for releasably securing together two elements one of which is relatively movable toward and away from the other in a vertical direction and provided with a retainer, a body member for rigid attachment to the other element, a vertically arranged screw member extending into the body member for up and down movement in angularly fixed relation to the body member, the screw member having a retainer-engaging part thereon, a rotary nut in the body member cooperating with the screw member for effecting reciprocating lengthwise movement of the last-mentioned member for engagement and release of the retainer by said part, and means for effecting rotary movement of the nut and including an operating shaft journaled horizontally in the body member.

2. In a fastener for releasably securing together two elements one of which is relatively movable toward and away from the other in a vertical direction and provided with a retainer, a body member for rigid attachment to the other element, a vertically arranged screw member extending into the body member for up and down movement in angularly fixed relation to the body member, the screw member having a retainer-engaging part thereon, a rotary nut in the body member for rotation on a vertical axis and cooperating with the screw member for effecting reciprocating lengthwise movement of the last-mentioned member for engagement and release of the retainer by said part, and means for effecting rotary movement of the nut comprising a bevel gear in fixed and concentric relation to the nut, said means also including a bevel gear member mounted in the body member for rotation on a horizontal axis and meshing with said bevel gear, said bevel gear member having an operating shaft portion extending without the body member.

3. In a fastener for releasably securing together a box-body element and lid element having a retainer thereon, a body member for attachment to the body element and providing an upwardly elongated chamber therein, a vertically arranged screw member extending downwardly through the top of the body member and into said chamber for up and down movement in angularly fixed relation to the body member, a retainer-engaging member pivoted to the upper end of the screw member, a rotary nut member in said chamber cooperating with the screw member for effecting reciprocating lengthwise movement of the last-mentioned member for engagement and release of the retainer by said retainer-engaging member, said nut member having a fixed concentric bevel gear on the bottom thereof, and a bevel gear member extending transversely of the chamber below the nut member and meshing with said bevel gear for effecting rotary movement of the nut member, said bevel gear member having a fixed concentric shaft portion extending without the body member for imparting rotary movement to said bevel gear member.

4. In a fastener for releasably securing together a box-body element and lid element having a retainer thereon, a body member for attachment to the box-body element and having an upwardly elongated chamber therein, a rotary nut in said chamber, a vertically arranged screw member extending through said body member in angularly rigid relation thereto and cooperating with the nut, a retainer-engaging member pivoted to the upper end of the screw member, a bevel gear fixed to the top of the nut in concentric relation thereto, and a bevel-gear member meshing with said bevel gear for rotating the nut and effecting reciprocating lengthwise movement of the screw member to engage and release the retainer-engaging member from the retainer, said bevel-gear member having an operating-shaft portion in fixed and concentric relation thereto extending without the body member.

5. In a fastener for securing together two elements, a first member having a base portion adapted to be secured to one of the elements and also having an interlocking portion extending along one face of said one of the elements, a second member having a base portion adapted to be secured to the other element and having a guideway extending along one face of said other element, an interlocking member adapted to interlock with the interlocking portion of the first member and slidable along the guideway in the second member, the interlocking member having a threaded end portion, a first bevel gear having a threaded portion engaging the threaded end portion of the interlocking member and mounted rotatably and against thrust in the second member, and a second bevel gear mounted rotatably in the second member in mesh with the first bevel gear and projecting away from the element on which the second member is mounted.

6. In combination, a casing member having a base and also including an opening extending parallel to the base and a first counterbore opening on one end, the member also having a bore normal to the first opening and extending through the member, the member also having a second counterbore opening at the base and aligned with the bore, a tubular member threaded internally and journaled in the first counterbore, the tubular member also having a bevel gear formed on its end innermost relative to the open end of the first counterbore, a second bevel gear having a first portion journaled in the second bore and meshing with the first bevel gear and a second shaft portion journaled in the second counterbore, and a fastener member including a threaded shank portion threaded into the tubular member and extending through the opening.

7. A fastener unit adapted to be secured to one face of a box or the like comprising a base portion adapted to be fastened to the face of the box, a tubular casing fixed to the base portion and extending parallely along said face, the casing having a bore extending therealong and thrust shoulder means extending into the bore, a cylindrical nut journaled in the bore and engaging the thrust shoulder means, the nut having a bevel gear portion formed on an end thereof positioned in the casing, a fastener member slidable in the opening and having a threaded shank portion threaded into the nut, the casing having a lateral bore in the portion of the side wall thereof positioned away from the base portion and a lateral opening in the side wall thereof diametrically opposite to the lateral bore, and a bevel gear member insertable into the casing through the lateral opening therein and having a shaft portion journaled in the lateral bore in the casing and accessible from the exterior of the casing for rotation thereof, the bevel gear member being in meshing engagement with the bevel gear portion of the nut for turning the nut to move the fastener along said face.

References Cited in the file of this patent

UNITED STATES PATENTS

| | | |
|---|---|---|
| 1,468,823 | Massuger et al. | Sept. 25, 1923 |
| 2,275,551 | Perrin | Mar. 10, 1942 |

FOREIGN PATENTS

| | | |
|---|---|---|
| 142,333 | Sweden | Sept. 29, 1953 |